E. McM. PENNOCK.
COOLER.
APPLICATION FILED JAN. 5, 1916.

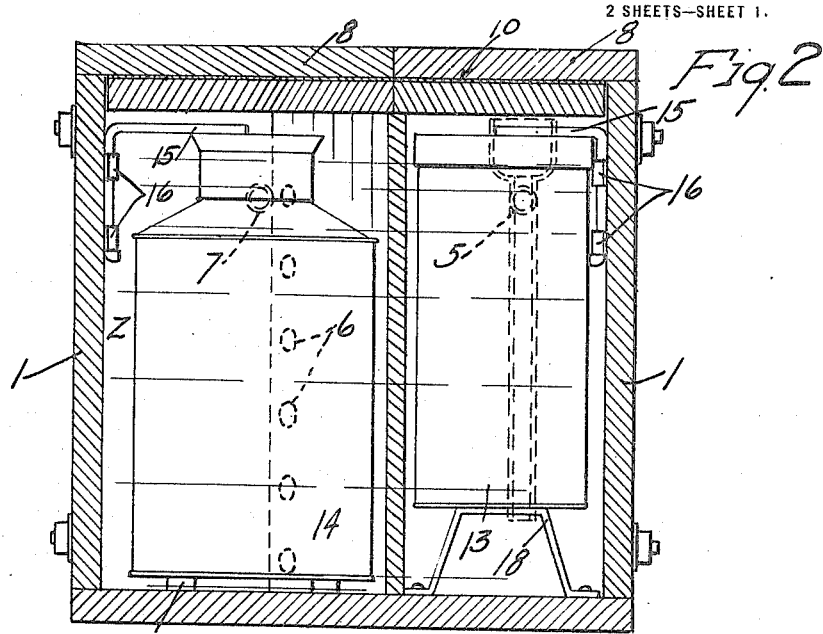

1,283,885.

Patented Nov. 5, 1918.
2 SHEETS—SHEET 2.

WITNESSES
E. C. Skinkle
G. F. Williamson

INVENTOR
Edward McM. Pennock
BY HIS ATTORNEYS
Williamson Merchant

UNITED STATES PATENT OFFICE.

EDWARD McM. PENNOCK, OF MINNEAPOLIS, MINNESOTA, ASSIGNOR TO MINNESOTA TANK & SILO COMPANY, OF MINNEAPOLIS, MINNESOTA, A CORPORATION OF MINNESOTA.

COOLER.

1,283,885. Specification of Letters Patent. Patented Nov. 5, 1918.

Application filed January 5, 1916. Serial No. 70,405.

*To all whom it may concern:*

Be it known that I, EDWARD McM. PENNOCK, a citizen of the United States, residing at Minneapolis, in the county of Hennepin and State of Minnesota, have invented certain new and useful Improvements in Coolers; and I do hereby declare the following to be a full, clear, and exact description of the invention, such as will enable others skilled in the art to which it appertains to make and use the same.

My invention relates to improvements in coolers, especially adapted for use in removing the animal heat from milk and cream, and is of the type wherein a flowing liquid is used as a tempering medium.

To the above end, generally stated, the invention consists of the novel devices and combinations of devices hereinafter described and defined in the claim.

In the accompanying drawings, which illustrate the invention, like characters indicate like parts throughout the several views.

Referring to the drawings,

Figure 1 is a plan view of the improved cooler;

Fig. 2 is a view in vertical section taken on the line $x^2$ $x^2$ of Fig. 1;

Figure 3:
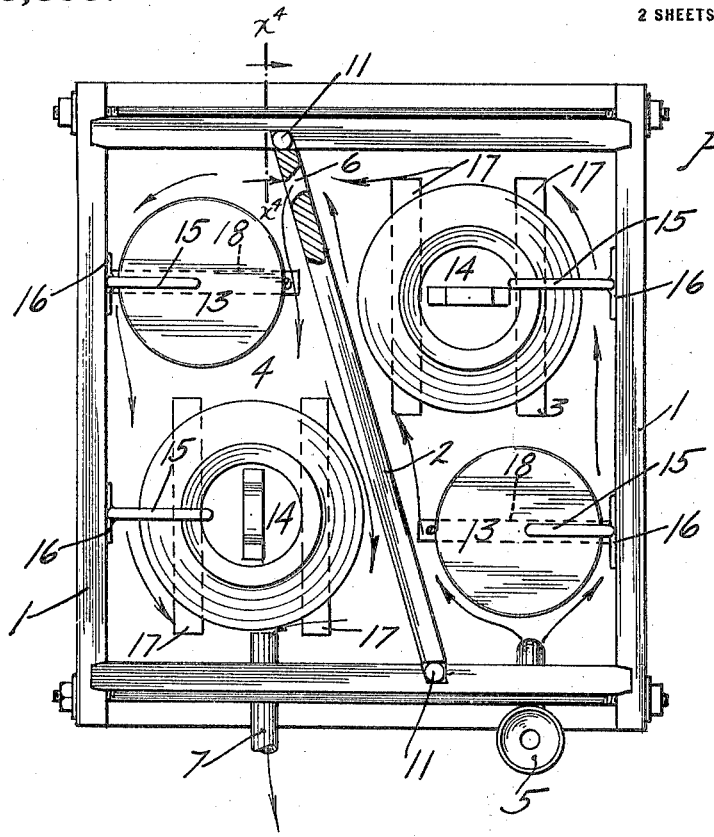
Fig. 3 is a view corresponding to Fig. 1, with the exception that the cover is removed and a portion of the baffle plate is shown in section.
Figure 4:
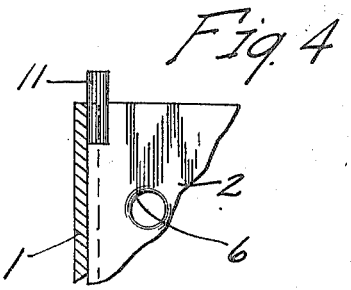
Fig. 4 is a fragmentary detail view with some parts sectioned on the line $x^4$ $x^4$ of Fig. 3.

The numeral 1 indicates a rectangular water tight tank within which is rigidly secured an upright partition or baffle plate 2 that divides said tank into two compartments 3 and 4. Water or other liquid tempering means is discharged into the compartment 3 of the tank 1 through a pipe 5 leading from any suitable source of supply. From the compartment 3, the liquid Z flows into the compartment 4 through a multiplicity of vertically spaced holes 6, which extend obliquely through the baffle plate 2 at the opposite side of the tank 1 from the pipe 5. Located in the same side of the tank 1 with the pipe 5, is an overflow pipe 7 through which the liquid Z is discharged from the compartment 4. The baffle plate 2 extends obliquely through the tank 1, in a manner that progressively increases the transverse width of the compartments 3 and 4 in the direction of the flow of the liquid Z therethrough, as indicated by arrows marked on Fig. 3.

The two compartments 3 and 4 are each closed by a cover 8. These two covers 8 are connected one with the other by a pair of hinges 9 and their hinged edges are formed oblique and directly overlie the baffle plate 2. As best shown in Fig. 2, the covers 8 are made of two thicknesses of boards or other suitable material and have interposed therebetween a sheet of insulating material 10. The upper thickness of the two covers 8 rests directly upon the upper edge of the tank 1 and the lower thickness thereof closely fits within the tank and holds said covers against sliding movement thereon. To prevent either one of the covers 8 from sliding on the tank 1, when the other thereof is open, I secure to the tank 1 two dowel pins 11, which project into half seats 12 formed in the oblique hinged edges of the covers 8.

In the small end of each compartment 3 and 4, is placed a cream can 13 and in the large end thereof, is placed a milk can 14. Both of these cans are of standard construction. The cans 13 and 14 are spaced apart from the walls of the tank 1 and the baffle plate 2 for the free circulation of the tempering medium Z therearound. Swinging arms 15 secured to the tank 1 by brackets 16 are provided for preventing the cans 13 and 14 from floating or moving under the action of the tempering liquid Z. These arms 15 are adapted to be turned into and out of overlapping engagement with the cans 13 and 14, as best shown in Fig. 2.

It is important to note that one of the cream cans 13 is placed directly in front of the discharge end of the pipe 5 and the other of said cream cans is placed directly in front of the opening 6 in the baffle plate 2. By thus locating the cream cans 13, the streams of liquid Z discharged from the pipe 5 and opening 6 strike said cans, are divided thereby and flow on each side of the cans 13. Owing to the increased diameters of the cans 14 over the cans 13, the tempering liquid Z in passing around both sides of the can 13, strikes the cans 14 well into their vertical centers and is deflected around both sides thereof. It will thus be seen that the tempering liquid Z, in flowing through the compartments 3 and 4, passes substantially around all of the cans 13 and 14, thereby evenly tempering the contents held therein. It will, of course, be understood, that in place of milk or cream other commodities may be placed within the cans 13 and 14.

To permit free circulation of the liquid Z under the cans 13 and 14, for the purpose of increasing the efficiency of the cooler, I support the cans 13 on cleats 17 and the cans 14 on metal brackets 18. The cleats 17 and brackets 18 are secured to the bottom of the tank 1 by means of nails, screws or other suitable means.

While the invention is especially adapted for use as a cooler with water as a tempering medium, it may be used broadly in connection with any kind of a tempering medium.

What I claim is:

The combination with a tank having an oblique partition dividing the same into two compartments, of a cover for the tank obliquely divided in the plane of said partition to afford a part for each of said compartments, hinges connecting the parts of the cover, dowel pins secured to the tank, and coöperating half seats in the oblique inner edges of the cover for the dowel pins.

In testimony whereof I affix my signature in presence of two witnesses.

EDWARD McM. PENNOCK.

Witnesses:
CLARA DEMAREST,
HARRY D. KILGORE.

Copies of this patent may be obtained for five cents each, by addressing the "Commissioner of Patents. Washington, D. C."